May 14, 1957 — S. I. GREENMAN — 2,792,480
SAFETY SWITCH FOR AUTOMOBILES
Filed Jan. 5, 1956 — 2 Sheets-Sheet 1
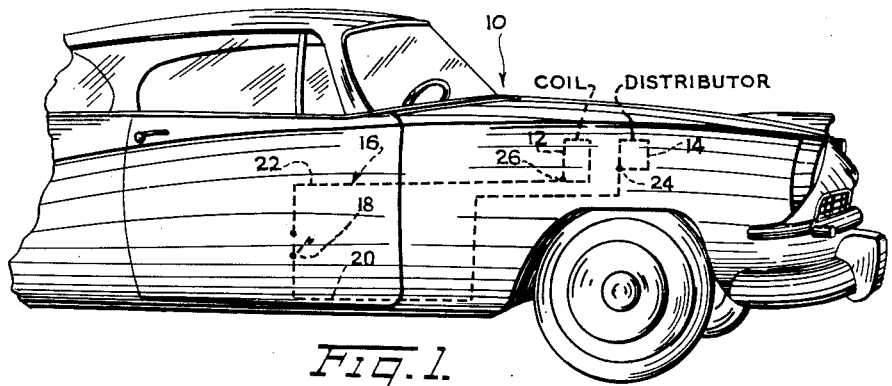
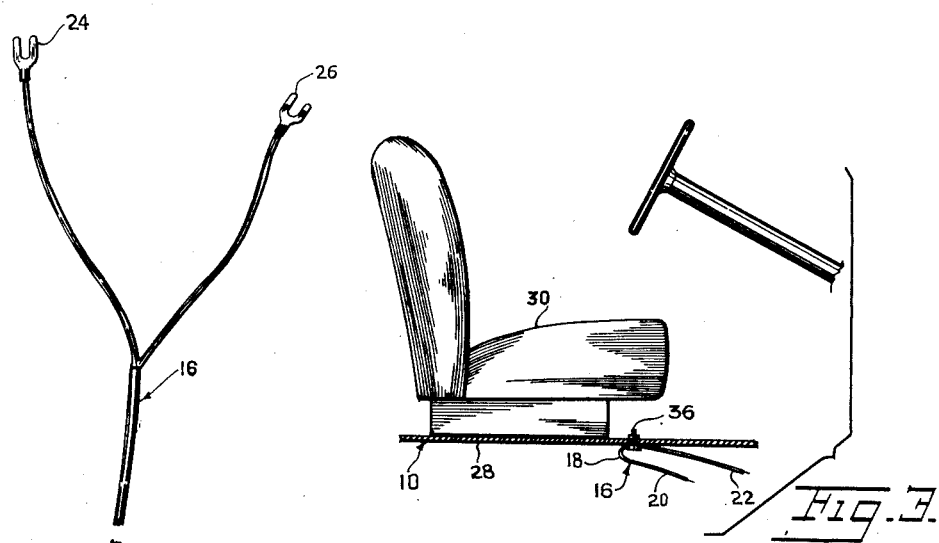
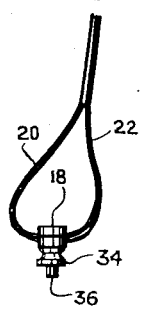
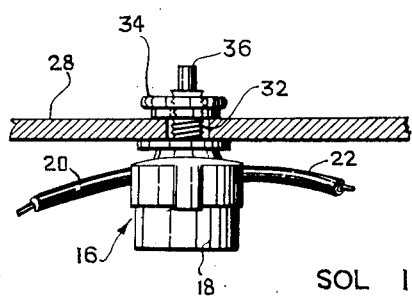
INVENTOR.
SOL I. GREENMAN
BY
ATTORNEY May 14, 1957  S. I. GREENMAN  2,792,480
SAFETY SWITCH FOR AUTOMOBILES
Filed Jan. 5, 1956　　2 Sheets-Sheet 2

INVENTOR.
SOL I. GREENMAN
BY
*ATTORNEY*

United States Patent Office 2,792,480
Patented May 14, 1957

2,792,480

SAFETY SWITCH FOR AUTOMOBILES

Sol I. Greenman, Brooklyn, N. Y.

Application January 5, 1956, Serial No. 557,579

4 Claims. (Cl. 200—153)

This invention relates to switches, and more particularly has reference to a switch adapted to be connected in series with the coil and distributor of an automobile, in such a manner that the vehicle owner, by locating the switch in a place on the vehicle where it will not be readily found by an unauthorized person, can prevent theft of the vehicle.

In many instances, automobiles are stolen even though the vehicle owner removes the ignition key. This is due to the fact that in a number of instances a thief may have a duplicate key, or alternatively, may cross ignition wires or use "jumpers" to provide electrical power for the vehicle even though the ignition remains locked.

The main object of the present invention, in view of the above, is to provide an antitheft device for a vehicle which will be readily connectible in the electrical system of the vehicle, and will include a switch capable of being readily hidden, so that its location will be known only to the vehicle owner. In this way, it is proposed to insure to the maximum that the vehicle will not be stolen or used without authorization, since the switch, when opened, will break the circuit to the coil and distributor even though the ignition is unlocked or the ignition wires are bridged or crossed.

A further object is to provide a device of the character stated that will be capable of manufacture at a very low cost, will be mountable at any of various points within the vehicle, according to the desires of the vehicle owner, and will be capable of installation with maximum speed and ease.

Yet another object is to provide a device as stated that will be capable of installation in any of various vehicles, regardless of the make or type of vehicle.

A further object of importance is to provide an antitheft device for vehicles which will be so designed as to be readily operable either with the hand or foot, depending on the location at which the switch means thereof is mounted.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a fragmentary perspective view of a vehicle, showing the coil, distributor, and antitheft device diagrammatically in dotted lines.

Fig. 2 is an enlarged elevational view, portions being broken away, of the antitheft device per se.

Fig. 3 is a somewhat diagrammatic sectional view through the passenger compartment of a vehicle showing the switch installed in the floor board below the seat.

Fig. 4 is an enlarged, fragmentary section through the floor board illustrating the switch in side elevation.

Figure 5:
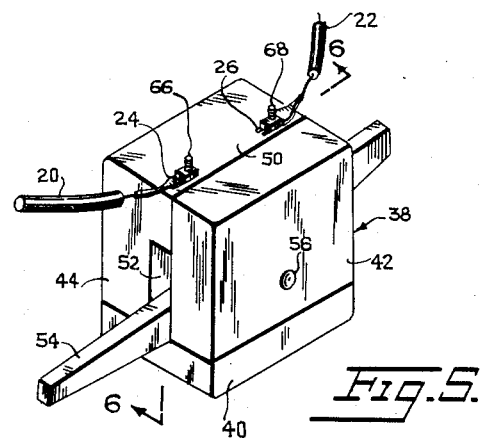
Fig. 5 is an enlarged perspective view of a modified form of switch.

A conventional vehicle, generally designated 10, is illustrated in Fig. 1, and includes the usual coil 12 and distributor 14. The antitheft device constituting the present invention has been generally designated at 16, and is connected between the terminals of the coil and distributor. Ordinarily, a wire is connected directly between said terminals, said wire having clips at opposite ends thereof that are fitted upon terminal screws of the coil and distributor, with nuts being then threaded upon the screws or studs to hold the clips in place.

In installing the device 16, said wire is removed by backing off the nuts, and the ends of the wires or leads extending from opposite terminals of a switch 18 are secured to the studs.

The switch 18 is per se conventional, and the leads extending from the opposite posts thereof have been designated at 20, 22.

At their free ends, the leads 20, 22 are secured to forked clips 24, 26 and these are secured to the terminals of the coil and distributor respectively when the device is installed.

The leads may of course be of any length desired, and this will permit the switch 18 to be hidden at any of various locations within the vehicle. For example, as shown in Fig. 3, the switch 18 can be mounted in the floor board 28, below the seat 30. In installation of the switch in this location, one would first drill a hole in the floor board, after which a threaded post 32 of switch 18 is extended through the hole, and a nut 34 threaded thereon against the top surface of the floor board to fixedly mount the switch.

Switch 18 is equipped with a depressible button 36, and is of a type wherein depression of the button when the terminals of the switch are bridged will open the switch, while depression of the button in the open condition of the switch will close the same.

In use, one may leave the ignition unlocked if desired, and depression of the button to open the switch will break a circuit between the coil and distributor, so that the possibility of theft is measurably reduced. Alternatively, the ignition might be locked and the key removed, and the switch opened, thus providing the maximum amount of insurance against theft of the vehicle.

The switch might be hidden in other locations, of course. For example, it could be installed in the space between the upholstery of the door and the wall of the door, with the user keeping in mind the particular location of the switch so that pressure on the upholstery at the proper location will result in depression of the switch button. Alternatively, it might be hidden in back of the instrument panel, or below the floor mat of the vehicle.

The illustrated switch need not necessarily be used in every instance, and any of various conventional switches might be employed, so long as they can be conveniently mounted in a particular location in the vehicle. It is desirable, in this regard, that the installation be facilitated to the maximum degree, and accordingly, in Figs. 5–7 there is shown a modified form wherein the switch has a base of magnetic material, permitting the switch to be positioned against any metallic surface and held in the selected location by magnetic attraction. This would be desirable by reason of the fact that not only does it permit the switch to be positioned at any of a large number of locations, but also in many of these locations the installation can be effected without requiring the drilling of a hole through which the leads 20, 22 are to extend. Still further, this construction has the advantage that the location of the switch can be changed from time to time, according to the desires of the owner.

The modified switch has been generally designated 38, and includes a rectangular, flat base 40 of magnetic material. Supported upon one side of the base is an upstanding, relatively narrow, rectangular block 42, and also supported upon the base, in side by side relation with block 42, is a second block 44 also of electrically insulative material such as molded plastic.

The blocks 42, 44 are secured to the base 40 by means of screws extending upwardly through countersunk corner openings 46 of the base. The screws have been designated at 48, and are extended into threaded recesses aligning with said corner openings.

At its upper end, block 44 is integrally formed with a laterally projecting, longitudinally extending lip 50, disposed in face to face contact with block 42. This defines between the blocks, below the lip, a cavity 52, opening upon the opposite ends of the switch as shown to best advantage in Fig. 6. The bottom surface of the cavity is defined by the magnetic base 40, and extending through the cavity is an elongated switch bar 54 of plastic or other electrically insulative material.

Intermediate its ends, switch bar 54 has an enlargement, and extending transversely of the switch bar in the area of the enlargement is an opening receiving a pivot pin 56 that extends through transversely aligned bearing openings provided in blocks 42, 44 respectively.

Figure 6:
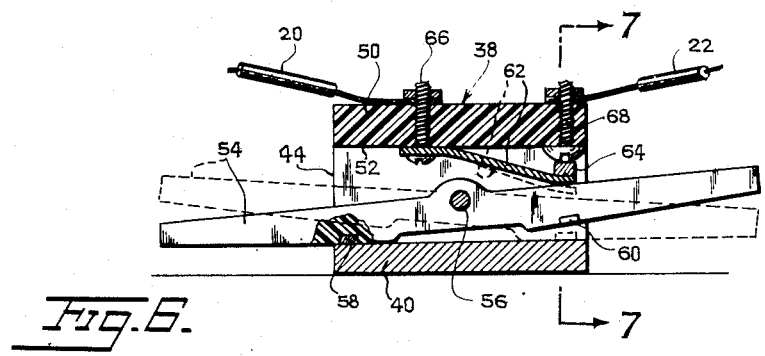
Fig. 6 is a longitudinal sectional view on line 6—6 of Fig. 5, the full and dotted lines showing the switch bar in opposite extreme positions to which it may be rocked.
Figure 7:
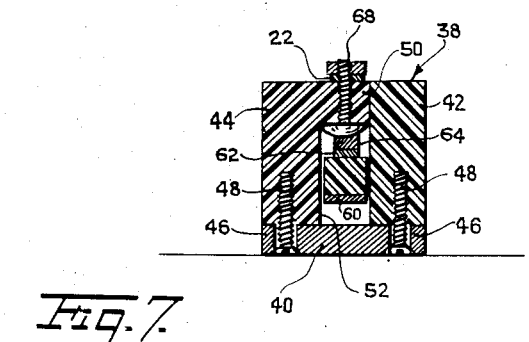
Fig. 7 is a transverse sectional view on line 7—7 of Fig. 6.

This mounts the switch bar for rocking movement within the housing defined by blocks 42, 44, and as shown in Fig. 6, the bar may be rocked about the axis defined by pin 56 between the full and dotted line positions illustrated. In this connection, the end portions of the switch bar have bottom surfaces that are disposed at a wide obtuse angle to one another, so that when the bar is rocked to its full line position, the bottom surface of the left-hand end portion (viewing the bar as in Fig. 6) will be disposed in face to face contact with the top surface of the magnetic base. Similarly, the bottom surface of the other end portion will be brought into contact with the base when the switch bar is rocked in an opposite direction.

Embedded in the undersides of the respective end portions of the switch bar are transversely extending inserts 58, 60 formed of any metal material that will be attracted by the magnet 40. These inserts are adapted to contact the base, on rocking of the switch bar in opposite directions.

It will thus be seen that assuming that the switch bar is in its full line position, it will be held in this poistion by attraction of insert 58 to base 40. On rocking of switch bar to its dotted line position, it will be similarly held by attraction of insert 60 to the base.

An elongated leaf spring 62 of electrically conductive material is disposed above the switch bar, and is formed with a compound curvature in a longitudinal direction as shown in Fig. 6. At its free end, the spring arm 62 is spaced a substantial distance from the lip 50, and secured fixedly to said free end of the arm is a contact 64.

At its other end, arm 62 is anchored fixedly to lip 50 by a binding screw 66 threadable upwardly through an opening formed in the lip 50.

Spaced longitudinally of lip 50 from the screw 66 is a second binding screw 68, threadable upwardly through lip 50. The head of the screw 68 is disposed in position to be engaged by the contact 64. The shanks of the screws 66, 68 project above the top surface of lip 50, to receive nuts that are threadable against the clips 24, 26 of the respective leads. As a result, whenever switch bar 54 is rocked to its full line position, the top surface of the right-hand end portion of the switch bar will bias the free end of arm 62 upwardly, to cause contact 64 to engage the head of screw 68, thus closing the switch.

The spring arm 62 is tensioned to normally shift away from screw 68 to the dotted line position shown in Fig. 6, and accordingly, whenever the switch bar is rocked to its dotted line position, this will permit the spring arm to flex downwardly, to open the switch.

The opposite extremities of the switch bar project beyond the opposite ends of the switch housing substantial distances, so that one may rock the switch arm in one or the other direction by downward pressure exerted with the heel of a shoe against one or the other end portions of the switch bar. Alternatively, the switch bar can be rocked manually, if the switch is not to be operated with the foot.

It will be seen that the base 40 discharges not only the function of causing the switch to adhere to any metallic surface selected within the vehicle, without the use of screws or other fastening means, but also discharges the function of holding the switch bar in selected positions to which it is rocked. Accordingly, the device can be moved from place to place, and further can be installed without the requirement of drilling holes in the vehicle body.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An antitheft device for vehicles comprising an electrical switch adapted to be concealed within a vehicle, and a pair of electrical conductors connected at one end to the switch and adapted at their other ends to be electrically connected between selected electrical devices of the vehicle, said switch including a magnetic base adapted for attraction to an adjacent metallic surface of the vehicle for mounting the switch upon said surface, the switch further including a housing secured to and supported upon said base, and a switch bar rockably mounted within the housing and adapted to be rocked in opposite directions by a user, said bar including spaced inserts formed of material attractable to said base, said inserts being disposed in opposite sides of the pivot axis of the bar so as to hold the bar in opposite extreme positions to which it is rocked, the switch additionally including normally spaced contacts closed by the bar on rocking of the bar to one of said extreme positions, one of said contacts being formed as a spring arm anchored at one end to the housing, and tensioned at its other end to normally shift away from the other contact.

2. An antitheft device for vehicles comprising an electrical switch adapted to be concealed within a vehicle, and a pair of electrical conductors connected at one end to the switch and adapted at their other ends to be electrically connected between selected electrical devices of the vehicle, said switch including a magnetic base adapted for attraction to an adjacent metallic surface of the vehicle for mounting the switch upon said surface, the switch further including a housing secured to and supported upon said base, and a switch bar rockably mounted within the housing and adapted to be rocked in opposite directions by a user, said bar including spaced inserts formed of material attractable to said base, said inserts being disposed in opposite sides of the pivot axis of the bar so as to hold the bar in opposite extreme positions to which it is rocked, the switch additionally including normally spaced contacts closed by the bar on rocking of the bar to one of said extreme positions, one of said contacts being formed as a spring arm anchored at one end to the housing, and tensioned at its other end to normally shift away from the other contact, the housing having an end-to-end cavity, the end portions of the bar projecting out of the respective ends of the cavity for operation of the bar by said user.

3. An antitheft device for vehicles comprising an electrical switch adapted to be concealed within a vehicle, and a pair of electrical conductors connected at one end to the switch and adapted at their other ends to be electrically connected between selected electrical devices of the vehicle, said switch including a magnetic base adapted for attraction to an adjacent metallic surface of the vehicle for mounting the switch upon said surface, the switch further including a housing secured to and supported upon said base, and a switch bar rockably mounted within the housing and adapted to be rocked in opposite directions by a user, said bar including spaced inserts formed of material attractable to said base, said inserts being disposed in opposite sides of the pivot axis of the bar so as to hold the bar in opposite extreme positions to which it is rocked, the switch additionally including normally spaced contacts closed by the bar on rocking of the bar to one of said extreme positions, one of said contacts being formed as a spring arm anchored at one end to the housing, and tensioned at its other end to normally shift away from the other contact, the housing having an end-to-end cavity, the end portions of the bar projecting out of the respective ends of the cavity for operation of the bar by said user, said ends of the bar having bottom surfaces disposed in obtuse angles to one another, each end having its bottom surface disposed in face-to-face contact with the base on rocking of the bar to a selected extreme position.

4. An antitheft device for vehicles comprising an electrical switch adapted to be concealed within a vehicle, and a pair of electrical conductors connected at one end to the switch and adapted at their other ends to be electrically connected between selected electrical devices of the vehicle, said switch including a magnetic base adapted for attraction to an adjacent metallic surface of the vehicle for mounting the switch upon said surface, the switch further including a housing secured to and supported upon said base, and a switch bar rockably mounted within the housing and adapted to be rocked in opposite directions by a user, said bar including spaced inserts formed of material attractable to said base, said inserts being disposed in opposite sides of the pivot axis of the bar so as to hold the bar in opposite extreme positions to which it is rocked, the switch additionally including normally spaced contacts closed by the bar on rocking of the bar to one of said extreme positions, one of said contacts being formed as a spring arm anchored at one end to the housing, and tensioned at its other end to normally shift away from the other contact, the housing having an end-to-end cavity, the end portions of the bar projecting out of the respective ends of the cavity for operation of the bar by said user, said ends of the bar having bottom surfaces disposed in obtuse angles to one another, each end having its bottom surface disposed in face-to-face contact with the base on rocking of the bar to a selected extreme position, said inserts being embedded in the bottom surfaces of said ends of the switch bar so as to be disposed in direct contact with the base in the respective extreme positions of the bar.

References Cited in the file of this patent
UNITED STATES PATENTS

| | | |
|---|---|---|
| 1,307,575 | Beall | June 24, 1919 |
| 1,688,479 | Wettengel | Oct. 23, 1928 |
| 2,414,653 | Lookholder | Jan. 21, 1947 |
| 2,676,221 | Malone | Apr. 20, 1954 |

FOREIGN PATENTS

| | | |
|---|---|---|
| 333,312 | Germany | Feb. 7, 1920 |